(12) United States Patent
Takeuchi

(10) Patent No.: US 7,399,116 B2
(45) Date of Patent: Jul. 15, 2008

(54) TEMPERATURE SENSOR CIRCUIT AND CALIBRATION METHOD THEREOF

(75) Inventor: Atsushi Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 11/028,649

(22) Filed: Jan. 5, 2005

(65) Prior Publication Data

US 2005/0271115 A1    Dec. 8, 2005

(30) Foreign Application Priority Data

Jun. 7, 2004   (JP) ............................. 2004-168699

(51) Int. Cl.
*G01K 15/00* (2006.01)
(52) U.S. Cl. .......................................... 374/1; 374/163
(58) Field of Classification Search ................ 374/1, 374/163
See application file for complete search history.

(56) References Cited

U.S. PATENT DOCUMENTS

| | | | | |
|---|---|---|---|---|
| 4,672,566 A | * | 6/1987 | Asano et al. ................... 702/99 |
| 5,134,309 A | * | 7/1992 | Matsumoto et al. ......... 327/100 |
| 6,334,093 B1 | * | 12/2001 | More ........................... 702/99 |
| 6,456,555 B2 | * | 9/2002 | Sim et al. .................... 365/226 |
| 6,784,736 B2 | * | 8/2004 | Parkhurst ..................... 330/255 |
| 7,029,171 B2 | * | 4/2006 | Tesi et al. ...................... 374/1 |
| 7,033,072 B2 | * | 4/2006 | Aota et al. .................. 374/178 |

FOREIGN PATENT DOCUMENTS

| | | |
|---|---|---|
| JP | 2000-165241 | 6/2000 |
| JP | 2002-149252 | 5/2002 |

* cited by examiner

*Primary Examiner*—Gail Verbitsky
*Assistant Examiner*—Mirellys Jagan
(74) *Attorney, Agent, or Firm*—Arent Fox LLP

(57) ABSTRACT

A temperature sensor circuit comprises a first monitor voltage generation circuit that generates a first monitor voltage with a characteristic that changes with respect to temperature; a second monitor voltage generation circuit that generates a second monitor voltage with a characteristic that changes by a variation amount different from the first monitor voltage with respect to the temperature; and a differential amplifier circuit, to which the first and second monitor voltages are inputted and that outputs the result of comparing the two voltages. Further, the differential amplifier circuit of the temperature sensor circuit is capable of switching to a first connection state, which outputs the comparison result, and to a second connection state, which outputs an offset monitor voltage that is rendered by adding the offset voltage of the differential amplifier circuit to the first or second monitor voltage or subtracting the offset voltage therefrom.

11 Claims, 13 Drawing Sheets

TEMPERATURE SENSOR CIRCUIT

TEMPERATURE SENSOR CIRCUIT

CHARACTERISTICS OF TEMPERATURE SENSOR CIRCUIT

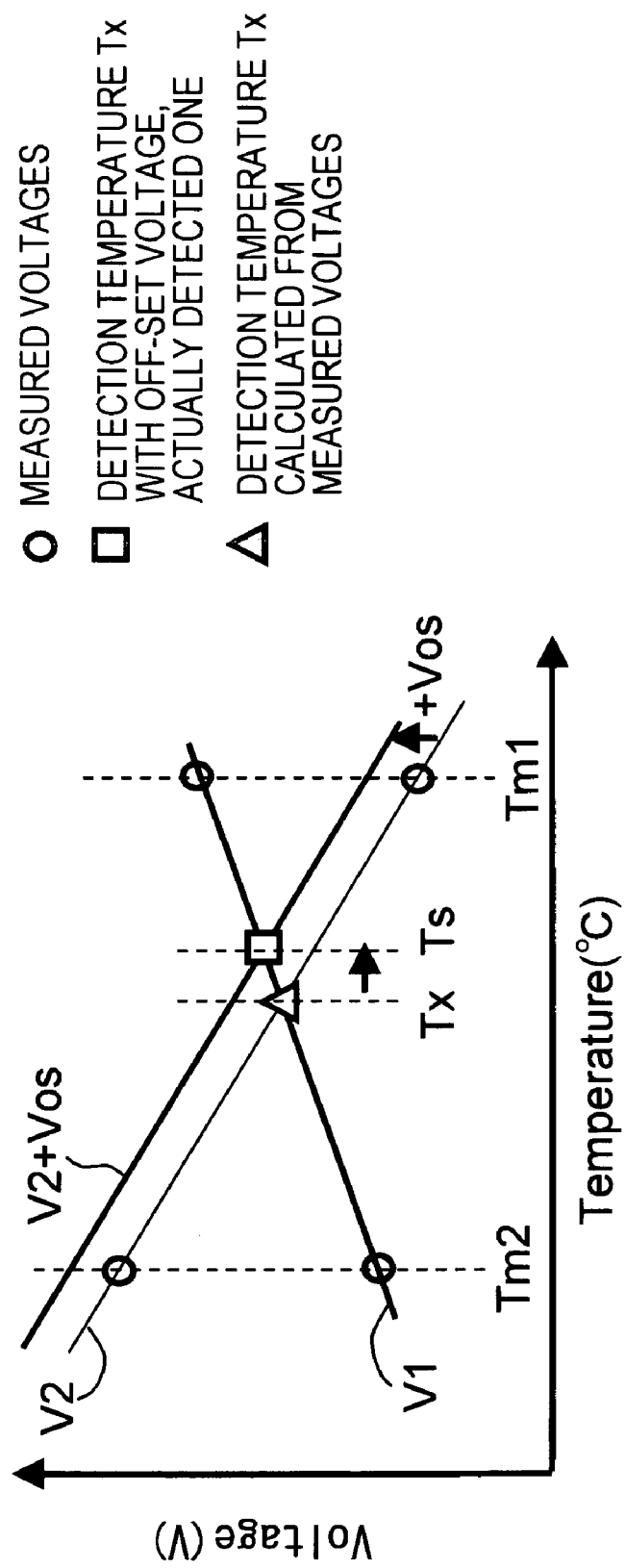
FIG. 4 PROBLEM OF OFF-SET VOLTAGE OF DIFFERENTIAL AMPLIFIER

CONNECTION STATES CAPABLE TO MEASURE VOLTAGE
INCLUDING OFF-SET VOLTAGE Vos
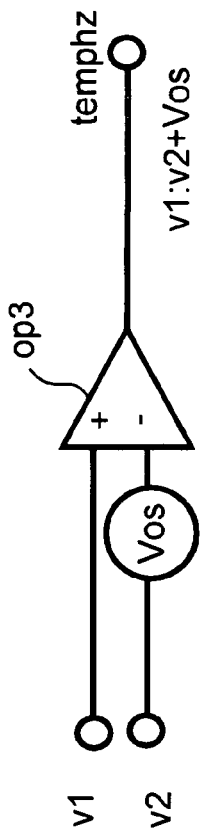
FIG. 5A  NORMAL CONNECTION STATE, FIRST CONNECTION STATE
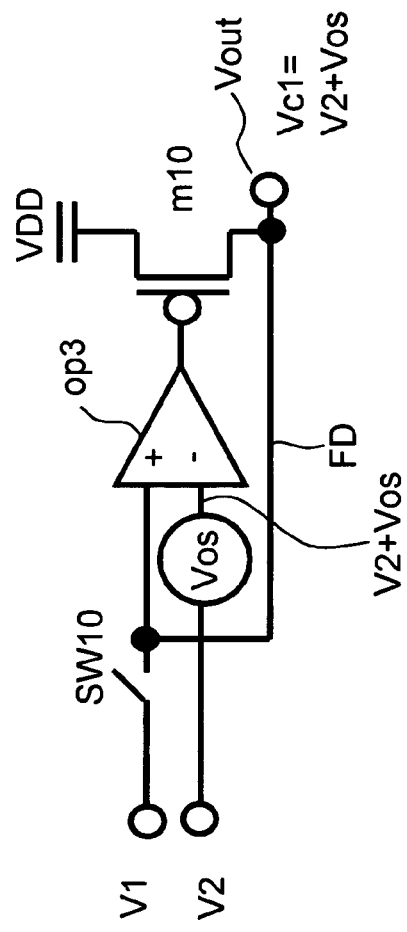
FIG. 5B  CONNECTION 1, SECOND CONNECTION STATE
(MONITOR VOLTAGE MEASUREMENT STATE)

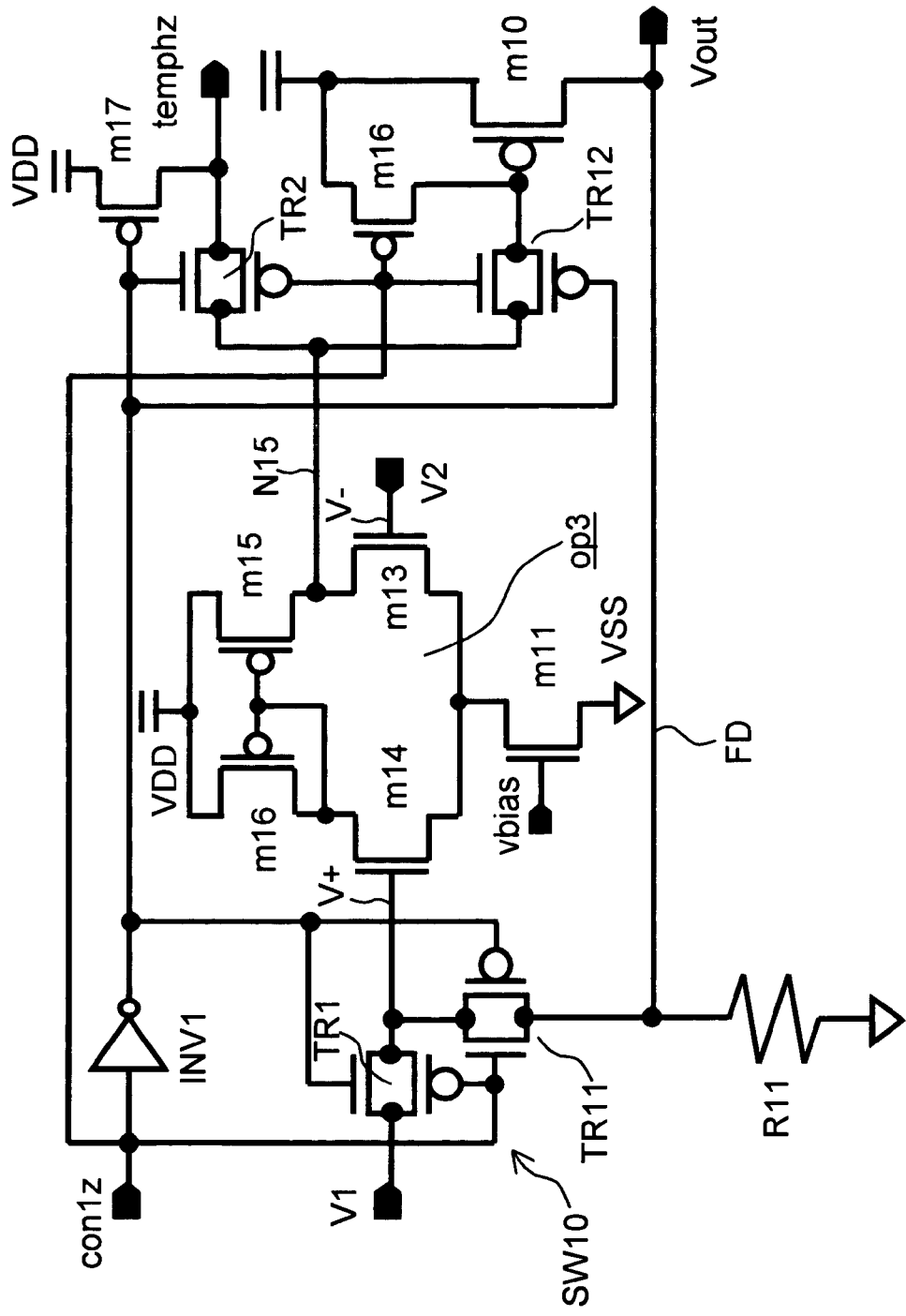
FIG. 6 DIFFERENTIAL AMPLIFIER CIRCUIT PERMITTING SWITCHING OF FIRST AND SECOND CONNECTION STATES

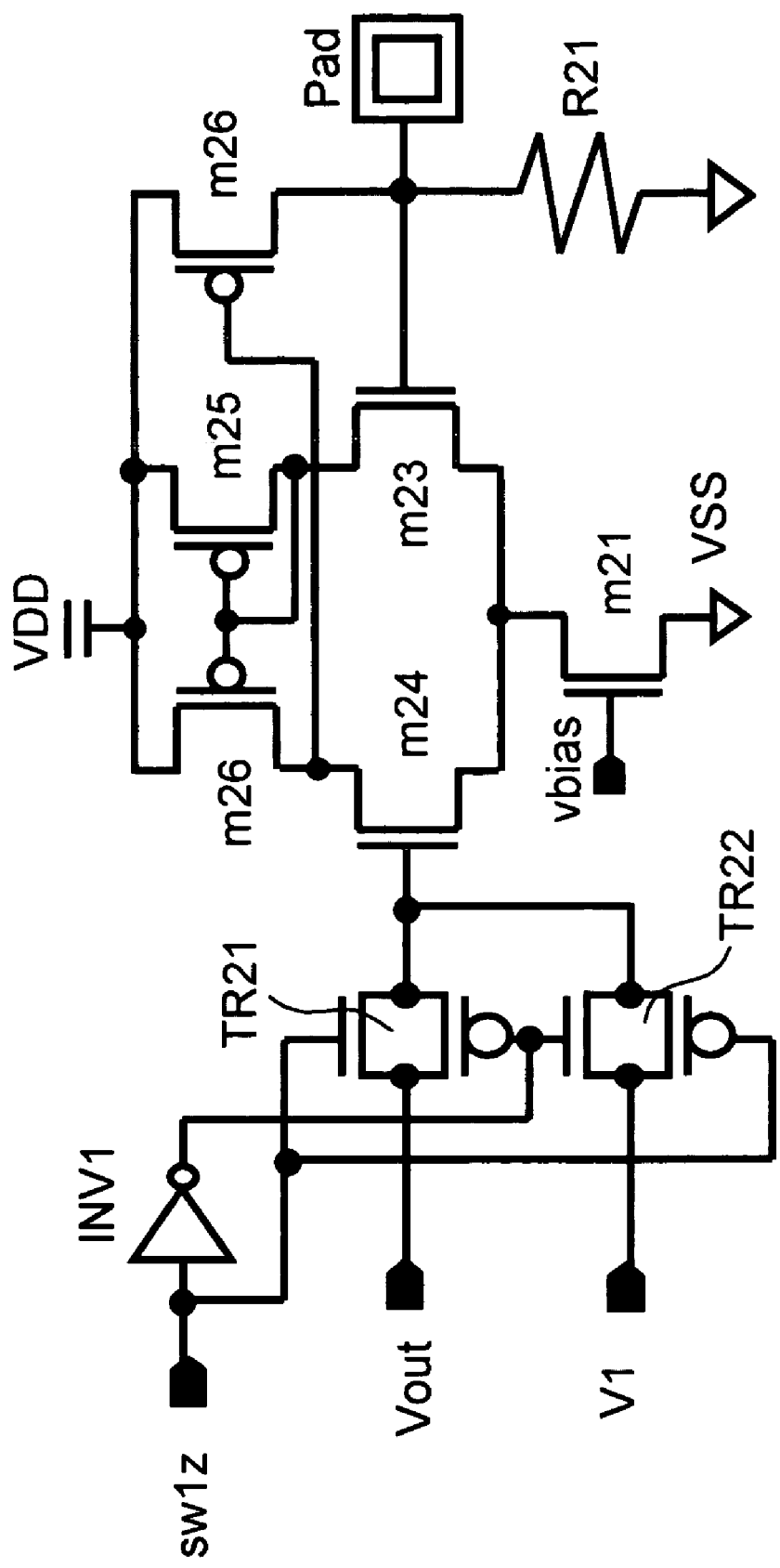
FIG. 7  PAD OUTPUT BUFFER CIRCUIT

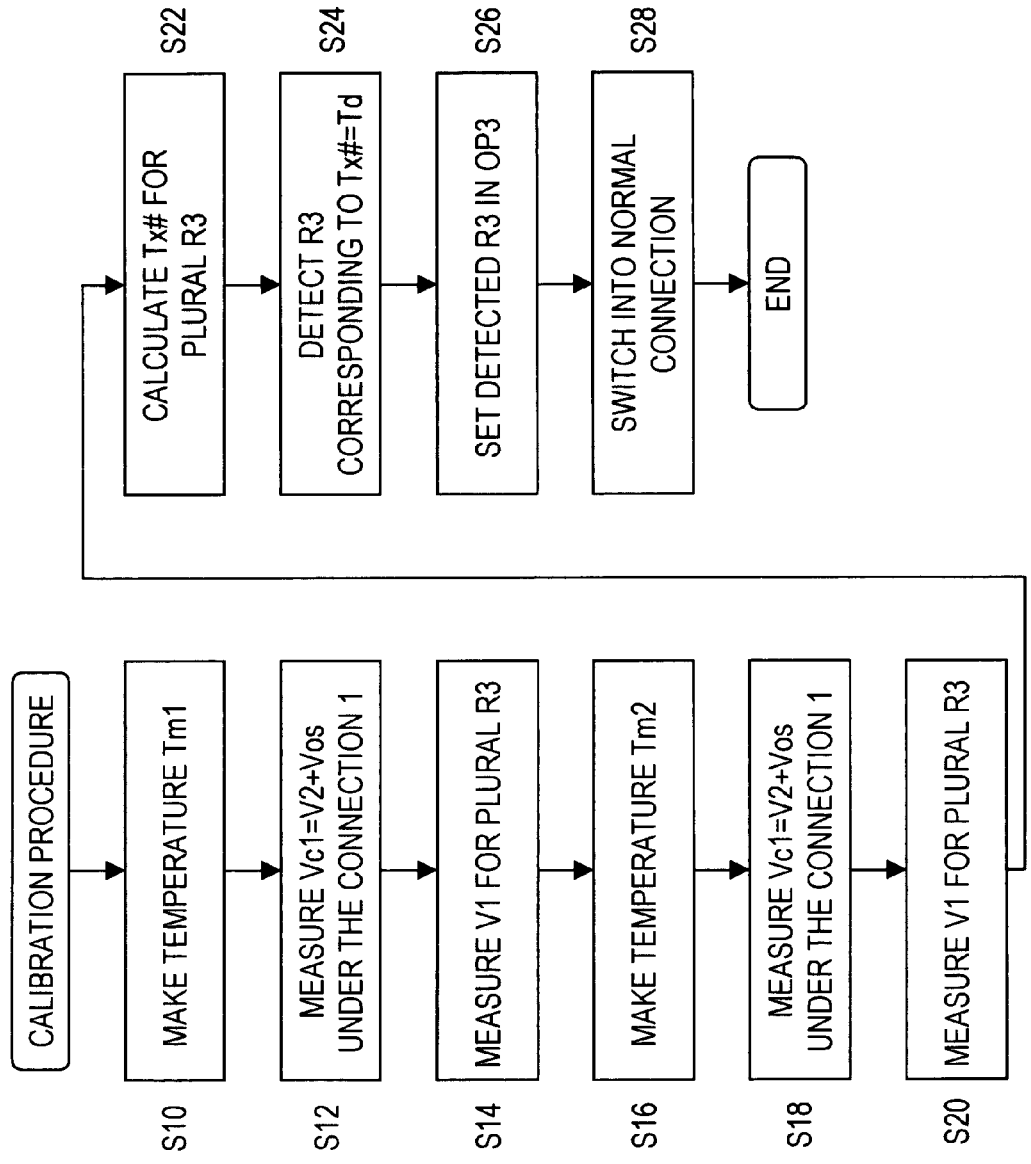

CONNECTION EXAMPLES PERMITTING SWITCHING OF FIRST AND SECOND CONNECTION STATES

NORMAL CONNECTION

CONNECTION 1

CONNECTION 2

CONNECTION 3

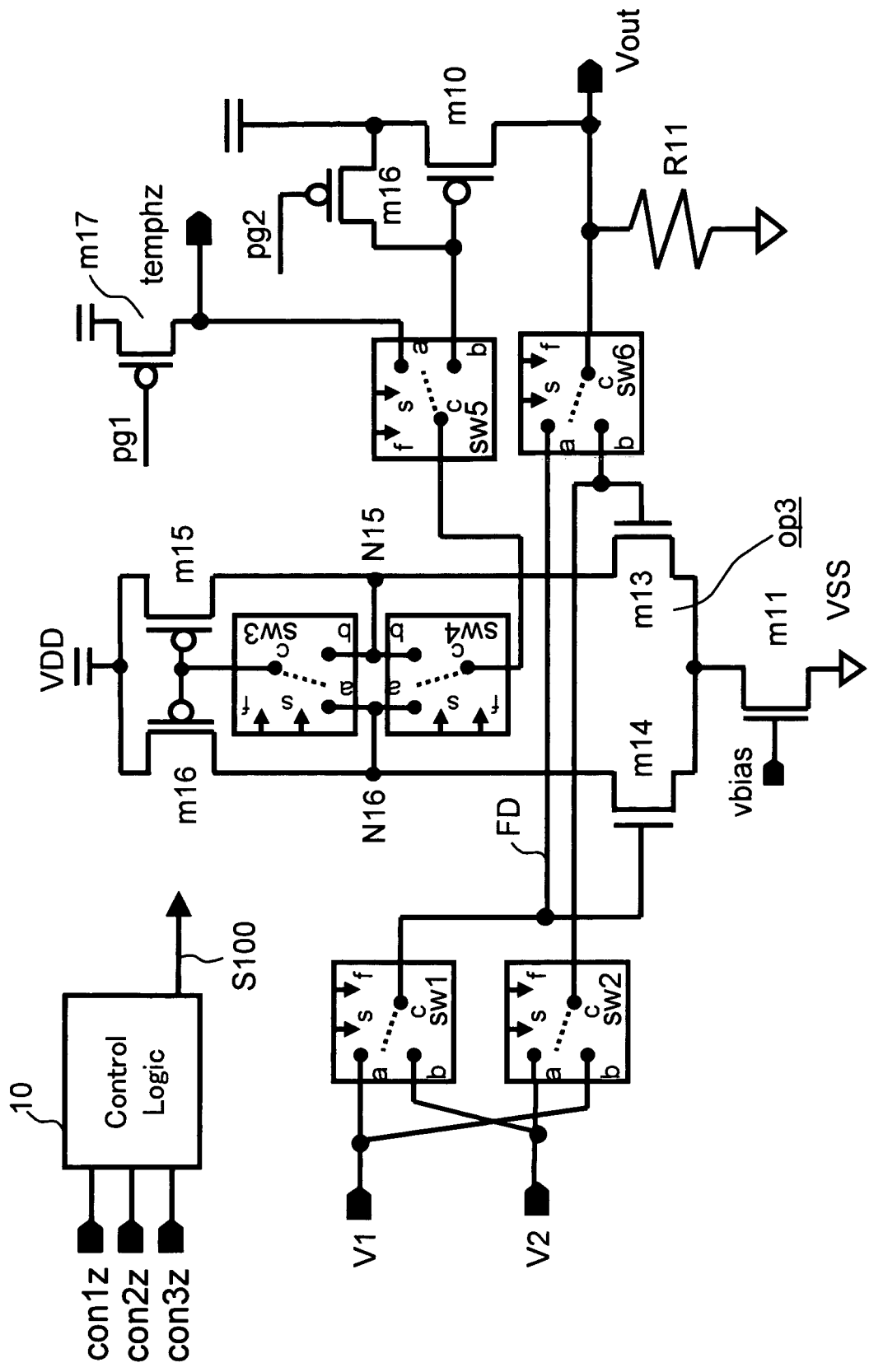
FIG. 10  DIFFERENTIAL AMPLIFIER ALLOWING CONNECTIONS OF NORMAL, 1, 2 AND 3

FIG. 12A

TRUTH TABLE FOR CONTROL LOGIC CIRCUIT

| | con | | | sw1 | | sw2 | | sw3 | | sw4 | | sw5 | | sw6 | | pg1 | pg2 |
|---|---|---|---|---|---|---|---|---|---|---|---|---|---|---|---|---|---|
| | 1z | 2z | 3z | f | s | f | s | f | s | f | s | f | s | f | s | | |
| Normal | 0 | 0 | 0 | 0 | 1 | 0 | 1 | 0 | 1 | 0 | 0 | 0 | 1 | 1 | * | 1 | 0 |
| Connect 1 | 1 | 0 | 0 | 1 | * | 0 | 1 | 1 | 0 | 0 | 0 | 0 | 0 | 0 | 1 | 0 | 1 |
| Connect 2 | 0 | 1 | 0 | 0 | 0 | 1 | * | 0 | 0 | 1 | 0 | 0 | 0 | 0 | 0 | 0 | 1 |
| Connect 3 | 0 | 0 | 1 | 1 | * | 0 | 0 | 1 | 0 | 0 | 0 | 0 | 0 | 1 | 1 | 0 | 1 |

FIG. 12B

| | sw1 | sw2 | sw3 | sw4 | sw5 | sw6 | m17 | m16 |
|---|---|---|---|---|---|---|---|---|
| Normal | a-c | a-c | a-c | b-c | a-c | HiZ | OFF | ON |
| Connect 1 | HiZ | a-c | a-c | b-c | b-c | a-c | ON | OFF |
| Connect 2 | b-c | HiZ | b-c | a-c | b-c | b-c | ON | OFF |
| Connect 3 | HiZ | b-c | a-c | b-c | b-c | a-c | ON | OFF |

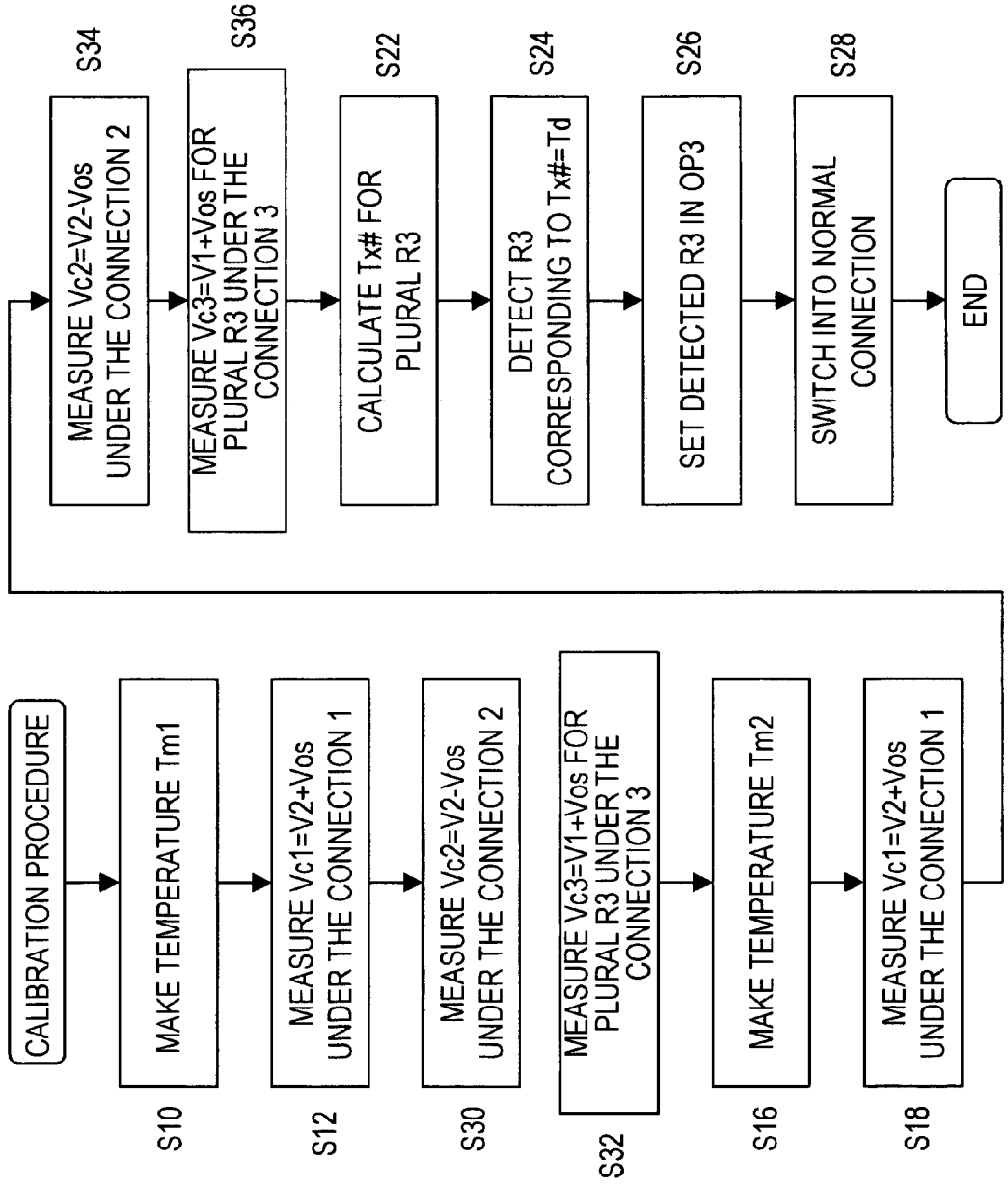
FIG. 13 FLOWCHART OF CALIBRATION PROCEDURE OF TEMPERATURE SENSOR CIRCUIT

TEMPERATURE SENSOR CIRCUIT AND CALIBRATION METHOD THEREOF

CROSS-REFERENCE TO RELATED APPLICATIONS

This application is based upon and claims the benefit of priority from the prior Japanese Patent Application No. 2004-168699, filed on Jun. 7, 2004, the entire contents of which are incorporated herein by reference.

BACKGROUND OF THE INVENTION

1. Field of the Invention

The present invention relates to a temperature sensor circuit, mounted on a semiconductor chip, that measures a predetermined temperature and to a calibration method thereof and, more particularly, to a temperature sensor circuit that facilitates high-precision calibration and a calibration method thereof.

2. Description of the Related Art

Temperature sensor circuits constituted by a semiconductor circuit are widely used. For example, in the case of Dynamic Random Access Memory (DRAM), it is necessary to refresh the data of internal memory cells at regular intervals, but the refresh cycle must be changed in accordance with the temperature of the semiconductor chip. That is, when the temperature is low, changes to the data of the memory cell can be slow and the refresh cycle can be extended. However, when the temperature is high, changes to the data of the memory cell are rapid and the refresh cycle must be shortened. Therefore, the temperature sensor circuit is mounted in the DRAM and the refresh cycle is changed in accordance with the sensor output of the temperature sensor circuit.

This temperature sensor circuit generates different temperature-dependent voltages and compares and detects these voltages by means of a differential amplifier circuit to yield an output. Further, as a circuit for generating a temperature-dependent voltage, a bandgap reference circuit may be used, as per Japanese Patent Application Laid Open No. 2002-149252 (published on May 24, 2002), for example.

Furthermore, the differential amplifier circuit of the temperature sensor circuit generally yields an offset. A variety of methods for correcting this offset have been proposed, as per Japanese Patent Application Laid Open No. 2000-165241 (published on Jun. 16, 2000), for example.

SUMMARY OF THE INVENTION

However, the temperature sensor circuit formed on the semiconductor chip is subject to scattering under due to the influence of process variations and, as a result, is faced by problem of variations in the detected temperature. In order to suppress such a variation in the detected temperature, calibration is performed so that the desired temperature is detected by fine-tuning or trimming the circuit elements of the temperature sensor circuit, such as the resistors, for example. Further, the calibration step must be executed by using a semiconductor integrated circuit tester. However, when high-precision calibration is to be performed, the calibration process is a burden and there is an increase in the costs of the semiconductor integrated circuit. Further, when calibration is to be performed at low cost, calibration for the correct detection temperature is difficult due to the offset of the differential amplifier circuit of the temperature sensor circuit.

Accordingly, an object of the present invention is to provide a temperature sensor circuit and calibration method thereof that makes it possible to calibrate the detection temperature highly precisely with minimal process steps.

In order to resolve this object, according to a first aspect of the present invention, the temperature sensor circuit comprises a first monitor voltage generation circuit that generates a first monitor voltage with a characteristic that changes with respect to temperature; a second monitor voltage generation circuit that generates a second monitor voltage with a characteristic that changes by a variation amount different from the first monitor voltage with respect to the temperature; and a differential amplifier circuit, to which the first and second monitor voltages are inputted and that outputs the result of comparing the two voltages. Further, the differential amplifier circuit of the temperature sensor circuit is capable of switching to a first connection state, which outputs the comparison result, and to a second connection state, which outputs an offset monitor voltage that is rendered by adding the offset voltage of the differential amplifier circuit to the first or second monitor voltage or subtracting the offset voltage therefrom.

According to the first aspect, in a preferred embodiment, the second connection state is a state where an input of the monitor voltage to one input terminal of the differential amplifier circuit is prohibited and where a negative feedback circuit is provided at the one input terminal from the output of the differential amplifier circuit. Further, this negative feedback circuit comprises an output transistor to the gate of which the output of the differential amplifier circuit is connected; and feedback wiring that connects the drain of the output transistor to the one input terminal of the differential amplifier circuit, for example.

In order to achieve the above object, according to a second aspect of the present invention, the method comprises, in the temperature sensor circuit, detecting a first-temperature state offset monitor voltage that is rendered by establishing the second connection state and adding the offset voltage to the first or second monitor voltage or subtracting the offset voltage therefrom in the first temperature state; detecting a second-temperature state offset monitor voltage that is rendered by adding the offset voltage to the first or second monitor voltage or subtracting the offset voltage therefrom in a second temperature state; and trimming the circuit elements of the first or second monitor voltage generation circuit to generate the first or second monitor voltage so that the detection temperature determined on the basis of the first- and second-temperature state offset monitor voltages becomes a desired detection temperature.

According to the above aspects of the present invention, the detection temperature can be calibrated highly precisely by means of minimal calibration process steps.

BRIEF DESCRIPTION OF THE DRAWINGS

FIG. 4 illustrates the problem of an offset voltage;

FIG. 5 shows connection states of the differential amplifier circuit of this embodiment;

FIG. 6 is a circuit diagram of the differential amplifier circuit that permits switching of the first and second connection states of this embodiment;

FIG. 7 is a circuit diagram of a pad output buffer circuit;

FIG. 8 is a flowchart of the calibration procedure of the temperature sensor of this embodiment;

FIG. 10 is a circuit diagram of a differential amplifier circuit that permits switching to the four connection states in FIG. 9;

FIG. 12 is a truth table that shows the operation of the control logic circuit 10 in FIG. 10; and FIG. 13 is a flowchart of the calibration procedure for the temperature sensor of this embodiment.

DESCRIPTION OF THE PREFERRED EMBODIMENTS

An embodiment of the present invention will be described with reference to the drawings. However, the technological scope of the present invention is not limited to this embodiment but, rather, extends to the inventions appearing in the claims and to any equivalents thereof.

Figure 1:
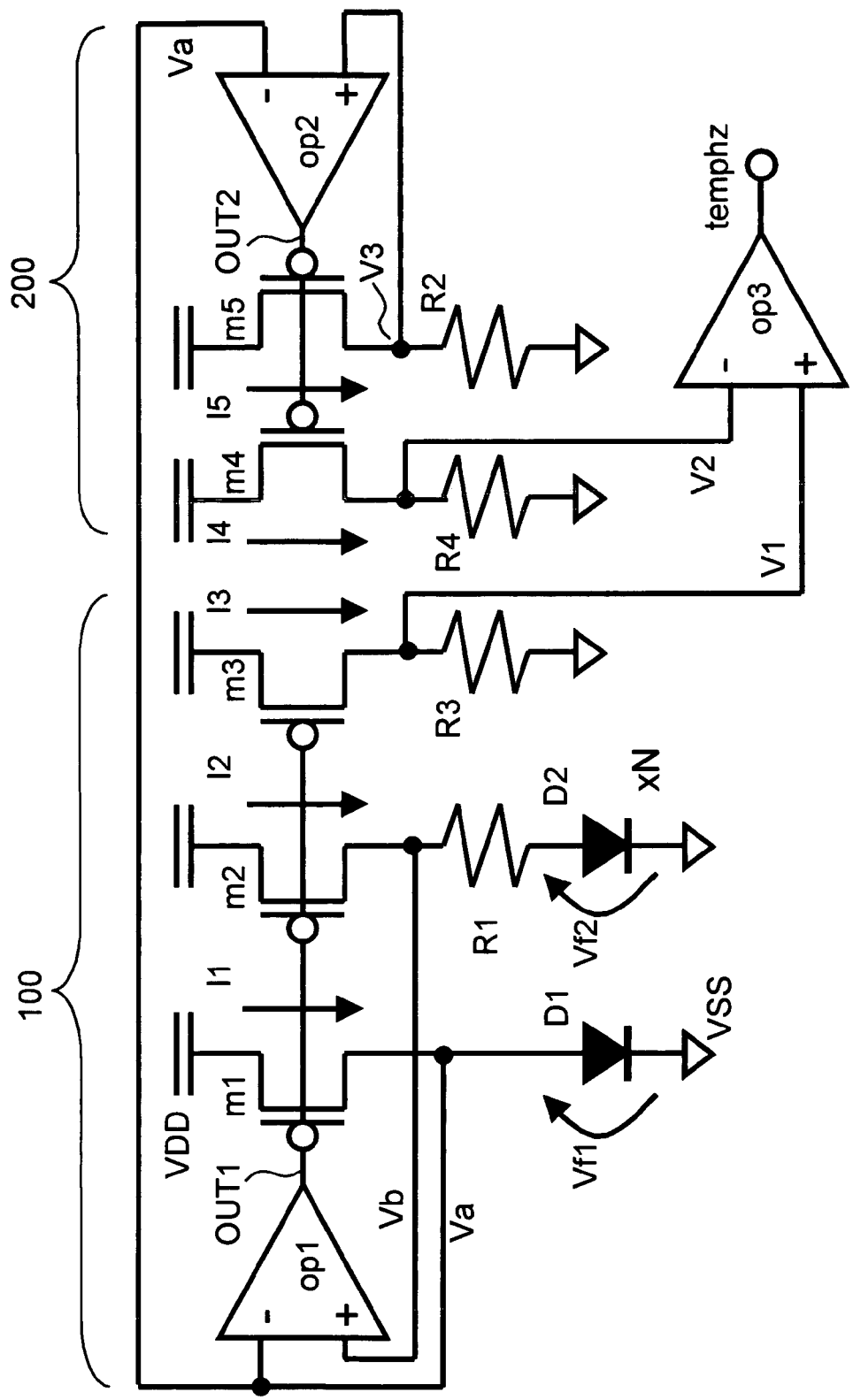
FIG. 1 shows the temperature sensor circuit of this embodiment.

FIG. 1 shows the temperature sensor circuit of this embodiment. This temperature sensor circuit comprises a first monitor voltage generation circuit 100, which generates a first monitor voltage V1 with a positive increase characteristic with respect to temperature, a second monitor voltage generation circuit 200, which generates a second monitor voltage V2 with a negative increase characteristic with respect to temperature; and a differential amplifier circuit op3, to which the first monitor voltage V1 and second monitor voltage V2 are inputted and that outputs the difference between the two voltages as the comparison result temphz. Further, the differential amplifier circuit op3 of the temperature sensor circuit is capable of switching to a first connection state that outputs the comparison result and a second connection state that outputs a voltage rendered by adding or subtracting the offset voltage of the differential amplifier circuit to or from the first or second monitor voltage. The switched connection states will be described hereinafter.

In the first monitor voltage generation circuit 100, the first differential amplifier circuit op1 compares the inputs Va and Vb and the differential output OUT1 is connected to the respective gates of the P-channel transistors m1 and m2, the drain terminals of these transistors being fed back negatively to the respective inputs Va and Vb respectively. The differential amplifier circuit op1 operates to render Va=Vb as a result of a negative feedback circuit that consists of the P-channel transistors m1 and m2 and feedback circuits for feedback to the inputs Va and Vb. Meanwhile, the input Va is connected to ground potential VSS via a diode D1 and therefore the potential of the input Va is the forward voltage Vf1 of the diode D1. The forward voltage Vf1 has a negative increase characteristic in response to temperature. Further, because the input Vb is connected to ground potential VSS via the resistor R1 and diode D2, the potential of the input Vb is the sum of the forward voltage Vf2 of the diode D2 and the voltage dV (=R1×I2) of the resistor R1. Therefore, because of Va=Vb, the voltage dV of the resistor R1 is dV=(kT/q)×lnN. Here, k is Boltzmann's constant, q is elementary electric charge, T is the absolute temperature, and N is the junction area ratio of the diodes D2 and D1. That is, the voltage of the resistor R1 possesses a positive proportionality relation with respect to temperature T, that is, a positive increase characteristic. The current I2 also has the same characteristic.

Further, because the output OUT1 of the first differential amplifier circuit op1 is connected to the gate of the P-channel transistor m3, the transistors m2 and m3 constitute a current mirror circuit and the current I3 flowing to the transistor m3 has the same trend as the current I2 flowing to the transistor m2. As a result, the first monitor voltage V1=I3×R3 has a positive proportionality relation with respect to temperature T, that is, a positive increase characteristic.

Meanwhile, in the case of the second monitor voltage generation circuit 200, a second differential amplifier circuit op2 compares the input Va and the voltage V3, the differential output OUT2 thereof is connected to the gate of the P-channel transistor m5 and the drain of the transistor m5 is fed back to the input V3. As a result of the negative feedback circuit, the second differential amplifier circuit op2 operates to render Va=V3. Meanwhile, because the input V3 is connected to ground VSS via the resistor R2, the voltage is then V3=I5×R2. Further, because voltage Va=Vf1, the voltage V3 has a negative proportionality relation with respect to temperature T, that is, a negative increase characteristic. Therefore, the current I5 of the transistor m5 also possesses the same negative proportionality relation, that is, negative increase characteristic. In addition, because the transistor M5 and transistor m4 constitute a current mirror circuit, the currents I5 and I4 are dimensioned in proportion to the size of the transistors m5 and m4 respectively and possess the same characteristics. Therefore, the second monitor voltage V2 also has the same characteristic as the voltage V3. That is, the second monitor voltage V2 has a negative proportionality relation with respect to temperature T, that is, a negative increase characteristic.

Figure 2A:
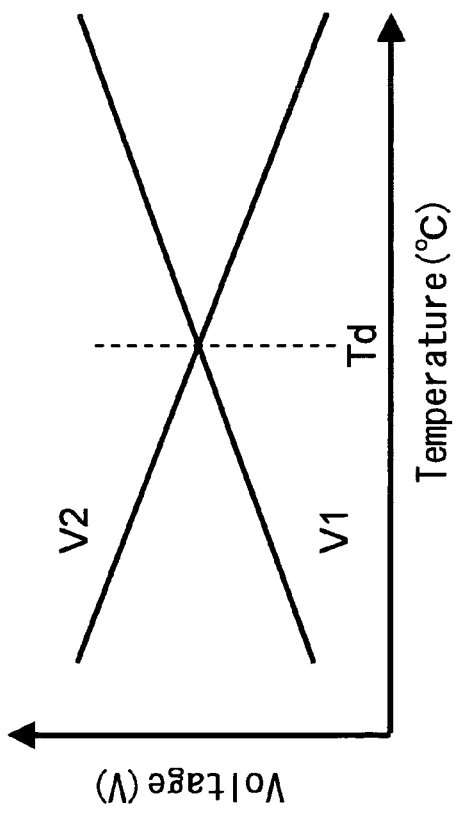
FIG. 2 is a characteristic diagram of the temperature sensor circuit.
Figure 2A:
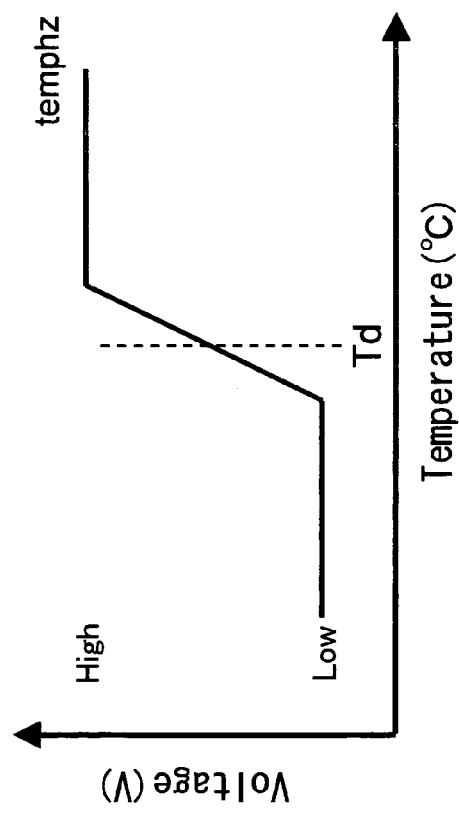

FIG. 2 is a characteristic diagram of the temperature sensor circuit. FIG. 2A is a graph showing the characteristics of the first monitor voltage V1 and second monitor voltage V2 with respect to temperature and FIG. 2B is a graph showing the characteristic of the output temphz of the differential amplifier circuit op3 with respect to temperature. The first monitor voltage V1 possesses a positive proportionality characteristic with respect to temperature T and the second monitor voltage V2 possesses a negative proportionality characteristic with respect to temperature T. These voltages intersect at a certain detection temperature Td. Correspondingly, the output temphz of the differential amplifier circuit op3 is inverted to a low level and high level before and after the detection temperature Td respectively. Therefore, the output temphz of the differential amplifier circuit op3 is a signal that indicates a temperature above the detection temperature Td (a high level) or a temperature below the detection temperature Td (a low level). If this output temphz is utilized, the refresh cycle of the DRAM can be controlled at a suitable length.

The first monitor voltage V1 and second monitor voltage V2 need not necessarily have positive and negative increase characteristics respectively with respect to temperature T. These voltages may have different variation amounts with respect to temperature T so as to possess a relationship in which the characteristics intersect one another as shown in FIG. 2A. As long as the first monitor voltage V1 and second monitor voltage V2 possess this characteristic relationship, the same temperature sensor circuit functions can be implemented.

As described above, the temperature sensor circuit shown in FIG. 1 is able to detect whether the temperature is higher or lower than the desired detection temperature Td. However, the first monitor voltage V1 and second monitor voltage V2 are scattered under the influence of variations in the fabrication process and, as a result, the detection temperature Td is also scattered. In FIG. 2A, if the first monitor voltage V1 rises, the detection temperature Td drops and, if V1 drops, the detection temperature Td rises. If the second monitor voltage V2 rises, the detection temperature Td also rises, and if V2 drops, Td also drops. Therefore, in order to cancel out the effects of variations in the fabrication process, the temperature sensor circuit must fine-tune (trim) the detection temperature. More specifically, the resistors R3 and R4 in the circuit of FIG. 1 can be variably set by means of fuse elements and test signals, and so forth.

A variety of methods may be considered for the calibration method by means of such trimming. For example, the temperature at which the output temphz varies is checked by scanning the temperature T for each resistor R3 or R4 while varying the resistor R3 or R4, and the temperature at which the output temphz changes is observed for each trimming point of the resistor R3 or R4. Then, the trimming point of the resistor R3 or R4 at which the output temphz changes at the desired temperature Td is set at the value of the resistor R3 or R4. However, this method cannot be said to be a realistic method due to the high costs and excessive process steps in the production.

Figure 3:
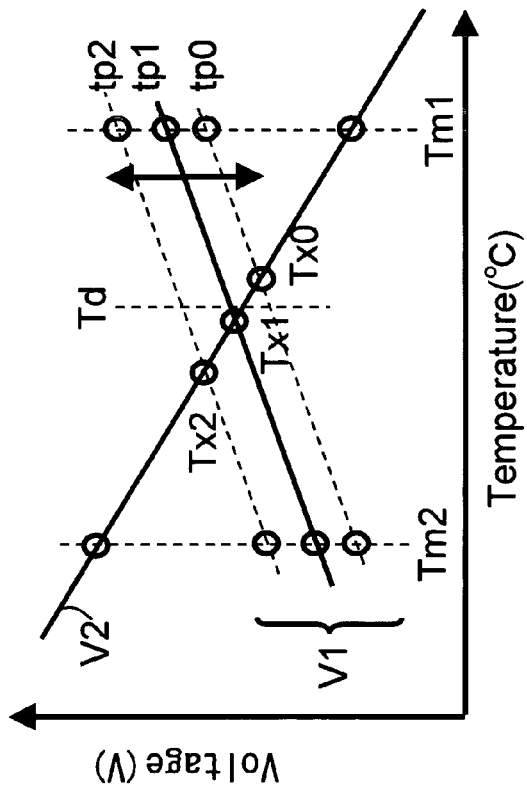
FIG. 3 shows the trimming method by means of dual-temperature voltage measurement of this embodiment.

FIG. 3 shows the trimming method by means of dual-temperature voltage measurement of this embodiment. According to this method, the first monitor voltage V1 and second monitor voltage V2 at predetermined temperatures Tm1 and Tm2 on both sides of the desired detection temperature Td are measured and the detection temperature is found through calculation from the first monitor voltage V1 and second monitor voltage V2 thus measured as shown in FIG. 3. The above procedure is performed for each trimming point of the resistor R3 or R4 to find the respective detection temperatures Tx0, Tx1, and Tx2. Further, the resistor R3 or R4 is set for each trimming point that corresponds with the detection temperature Tx0, Tx1, or Tx2 that is closest to the desired detection temperature Td.

In the example in FIG. 3, the resistor R4 is fixed and the trimming point of the resistor R3 is determined. That is, at temperature Tm1, the second monitor voltage V2 is measured and the first monitor voltage V1 corresponding with a plurality of trimming points tp0 to tp2 of the resistor R3 is measured. Likewise, at temperature Tm2, the second monitor voltage V2 is measured and the first monitor voltage V1 corresponding with a plurality of trimming points tp0 to tp2 of the resistor R3 is measured. Further, the detection temperatures Tx0 to Tx2 at which the two monitor voltages V1 and V2 intersect are found through calculation from the measured voltages (the voltages marked with circles in FIG. 3). The calculation method is as per FIG. 3, for example. Because the two monitor voltages have a positive or negative proportionality relation, the detection temperatures Tx0 to Tx2 at the intersecting points can be found by means of linear interpolation from the four measurement points above. The resistor R3 is then set at the trimming point tp1 that corresponds with detection temperature Tx1, which is closest to the desired detection temperature Td.

Conversely, the resistor R3 may be fixed and the trimming point of resistor R4 may be determined. In this case, the second monitor voltage V2 must be detected with respect to a plurality of trimming points. Alternatively, a plurality of trimming points may be determined with respect to both the resistor R3 and R4.

According to the above trimming method, the optimum trimming point of the resistor R3 or R4 is determined by directly measuring the first monitor voltage V1 and second monitor voltage V2. However, this method does not consider the offset voltage that exists in the differential amplifier circuit op3 and, therefore, when the offset voltage is large, there is the problem that even when the resistors R3 and R4 are trimmed accordingly, the desired detection temperature Td cannot be detected highly precisely. Owing to the scatter of the characteristics of the transistor and so forth of the differential amplifier circuit op3, a state in which the differential amplifier circuit is balanced is not necessarily a state where the input V1=V2, but instead a state where V1=V2+Vos, which is the result of a shift by the offset voltage Vos. Therefore, because the determination of the trimming point from the input voltages V1 and V2 does not consider the offset voltage Vos, the detection temperature is subject to a shift through the offset voltage.

FIG. 4 illustrates the problem of the offset voltage. In FIG. 4, the circle marks are voltages that have been measured by means of the above trimming method and the triangle mark is a detection temperature Tx that is calculated from these measurement voltages. On the other hand, when, as described above, an offset voltage Vos exists in the differential amplifier circuit and the differential amplifier circuit is balanced such that V1=V2+Vos, for example, a square mark is the detection temperature Ts that is actually detected. That is, a shift exists between the calculated detection temperature Tx and the actual detection temperature Ts.

Therefore, in this embodiment, the differential amplifier circuit op3 has a constitution that is capable of switching to a first connection state (normal state), which outputs the result of a comparison between the first and second monitor voltages and a second connection state (trimming state), which outputs an offset monitor voltage that is rendered by adding the offset voltage of the differential amplifier circuit to the first or second monitor voltage or subtracting the offset voltage therefrom.

FIG. 5 shows connection states of the differential amplifier circuit of this embodiment. FIG. 5A is the first connection state, which outputs a comparison result constituting the differential voltage of the first monitor voltage V1 and second monitor voltage V2, which is the normal connection state. In FIG. 5, the offset voltage Vos is provided on the side of the second monitor voltage V2 as an equivalence circuit. However, the offset voltage Vos may be provided on the side of the first monitor voltage V1. In this connection state, as shown in FIG. 4, the differential amplifier circuit op3 generates, as the output signal temphz, the result of a comparison between the first monitor voltage V1 and the voltage V2+Vos, which is rendered by adding a offset voltage Vos to the second monitor voltage V2.

Meanwhile, FIG. 5B represents the second connection state, which outputs to Vout a voltage rendered by adding the offset voltage Vos to the second monitor voltage V2 (Vc1=V2+Vos), which is the connection state during monitor voltage measurement when trimming is executed. That is, in the state of connection 1 shown in FIG. 5B, the input of the first monitor voltage V1 to the noninverting input terminal of the differential amplifier circuit is prohibited by turning OFF a switch SW10, the output of the differential amplifier circuit op3 is connected to the gate of the P-channel transistor m10, and the drain of the transistor m10 is the output terminal Vout and is fed back to the noninverting input terminal of the differential amplifier circuit op3. A negative feedback circuit is constituted for the differential amplifier circuit op3 by means of the transistor m10 and feedback wiring FD. As a result of this constitution, in a state where the differential amplifier circuit op3 is balanced, the two inputs Vout (=Vc1) and V2+Vos are equal and an offset monitor voltage Vc1=V2+Vos is outputted to the output terminal Vout. That is, by rendering the state of connection 1 in FIG. 5B, a voltage rendered by adding the offset voltage Vos to the second monitor voltage V2 can be detected from the output terminal Vout.

Further, even when the offset voltage Vos exists on the side of the noninverting input terminal, the connection state of FIG. 5B is such that the voltage rendered by adding the offset voltage Vos to the second monitor voltage V2 (or subtracting the offset voltage therefrom) can likewise be calculated from the output terminal Vout. In addition, in the connection state in FIG. 5B, when the first monitor voltage V1 and second monitor voltage V2 are reversed, a voltage rendered by adding the offset voltage Vos to the first monitor voltage V1 can be measured from the output terminal Vout.

Therefore, returning to FIG. 4, if the offset monitor voltage V2+Vos, which is rendered by adding an offset voltage Vos, can be measured instead of the second monitor voltage V2, the detection temperature Ts can be found through calculation from the measured voltage value. Therefore, in a state where the effect of the offset voltage of the differential amplifier circuit has been added, the detection temperature Ts can be found and trimming can be performed highly precisely.

FIG. 6 is a circuit diagram of the differential amplifier circuit that permits switching of the first and second connection states of this embodiment. In this circuit, the differential amplifier circuit op3 is formed by transistors m11 to m16. Further, in this circuit, two sets of CMOS transfer gates TR1, TR11, and TR2, TR12, which are switched by a control signal con1z, are provided, such that a normal connection (first connection state) results when the control signal con1z is at the low level and the trimming state, the state of connection 1 (second connection state) results when the control signal con1z is at the high level.

In the normal connection state when the control signal con1z is at the low level, the transfer gates TR1 and TR2 conduct and the transfer gates TR11 and TR12 are both nonconductive, meaning that the first monitor voltage V1 is inputted to the noninverting input terminal V+ of the differential amplifier circuit op3 and the node N15 is connected to the detection output temphz via the transfer gate TR2. Here, the output of the inverter INV1 is at the high level and the transistor m17 is OFF. Further, the transistor m16 is turned ON and the transistor m10 enters an OFF state, meaning that the feedback wiring FD is rendered ineffective.

In a state where the control signal con1z is in the high-level, voltage measurement state, the transfer gates TR1 and TR2 are nonconductive and the transfer gates TR11 and TR12 are both conductive, meaning that the input of the first monitor voltage V1 is prohibited and the feedback wiring FD is connected to the noninverting input terminal V+ via the transfer gate TR11. Further, the transistor m16 is turned OFF and the node N15 is connected to the gate of the transistor m10 via the transfer gate TR12. As a result, the output N15 of the differential amplifier circuit op3 is then constituted to be fed back negatively to the noninverting input terminal V+ by means of the transistor m10 and feedback wiring FD and hence the offset monitor voltage V2+Vos is outputted to the output terminal Vout. In this state, the connection is the same as FIG. 5B.

FIG. 7 is a circuit diagram of a pad output buffer circuit. In a case where the offset monitor voltage V2+Vos is measured from the output terminal Vout in the differential amplifier circuit shown in FIG. 6 and the first monitor voltage V1 is measured, if the input impedance of the measuring device is low, there is an excessive input current to the measuring device and the measurement voltage drops. In order to avoid this, it is desirable to measure the output terminal Vout and the first monitor voltage V1 by using the pad output buffer circuit shown in FIG. 7.

In FIG. 7, a differential amplifier circuit is constituted by means of transistors m21 to m26 such that the drain terminal of the transistor m24 is connected to the output P-channel transistor m26 and the drain of the output transistor m26 is fed back negatively to the gate of the transistor m23. By rendering an operational amplifier constitution in which a negative feedback circuit is provided in the differential amplifier circuit in this way, the voltage applied to the gate of the transistor m24 can be outputted from the output pad Pad. Moreover, because the output transistor m26 is large, same has an adequate current driving capability and therefore the voltage can be measured highly precisely even in the case of a measuring device with a low input impedance.

Therefore, when the control signal sw1z is set high, the transfer gate TR21 conducts and the output terminal Vout in FIG. 6 is connected to the gate of the transistor m24 and the voltage V2+Vos of the output terminal Vout is outputted to the output pad Pad. Further, when the control signal sw1z is set low, the transfer gate TR22 conducts such that the first monitor voltage V1 is connected to the gate of the transistor m24 and the first monitor voltage V1 is outputted to the output pad Pad.

Although an offset voltage also exists in the pad output buffer circuit in FIG. 7, the offset voltage is applied to both of the two measured voltages and there is therefore no effect on the calibration.

FIG. 8 is a flowchart of the calibration procedure of the temperature sensor of this embodiment. In the calibration, the temperature is first Tm1 (S10), Vc1=V2+Vos is measured from the output terminal Vout in the state of connection 1 (S12) and the first monitor voltage V1 with respect to R3 at a plurality of trimming points is measured (S14). Next, the temperature is Tm2 (S16), Vc1=V2+Vos is measured from the output terminal Vout in the state of connection 1 (S18) and the first monitor voltage V1 with respect to R3 at a plurality of trimming points is measured (S20). Further, the detection temperature Tx# with respect to R3 at the plurality of trimming points are found through calculation (S22) and the trimming point of resistor R3 that corresponds with the detection temperature Tx# that is closest to the desired detection temperature Td is detected (S24). The detection temperature Tx# is found by adding the effect of the offset voltage Vos of the differential amplifier circuit op3 and therefore corresponds to the actual detection temperature. The trimming point of the resistor R3 is set for the optimum resistor R3 detected as detailed above (S26). The differential amplifier circuit is then restored to a normal connection (S28).

FIG. 9 shows a connection example of the differential amplifier circuit that permits monitor voltage measurement including an offset voltage according to this embodiment. In the example of FIG. 9, the switchable connection states of connection 2 of FIG. 9C and connection 3 of FIG. 9D are included in addition to the normal connection example of FIG. 5A and connection 1 of FIG. 5B. As described above, in connection 1 of FIG. 9B, Vc1=V2+Vos is detected from the output terminal Vout. Further, in connection 2 of FIG. 9C, the second monitor voltage V2 is supplied to the inverting input terminal of the differential amplifier circuit op3, the input of the first monitor voltage V1 is prohibited, and the drain Vout of the P-channel transistor m10 is fed back to the noninverting input terminal of the differential amplifier circuit op3. When this connection state is established, in a balanced state, V2=Vc2+Vos and Vc2=V2−Vos is outputted to the output terminal Vout.

Figure 9A:
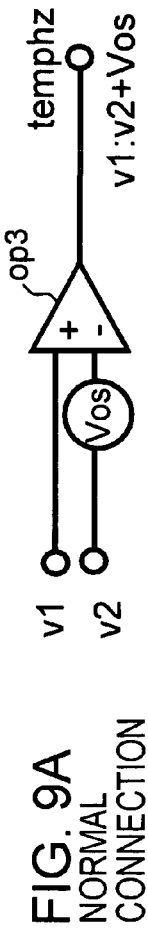
FIG. 9 shows a connection example of the differential amplifier circuit that permits monitor voltage measurement including an offset voltage according to this embodiment.
Figure 9B:
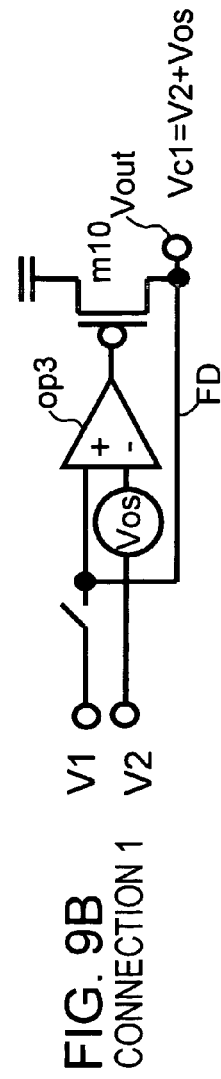
Figure 9C:
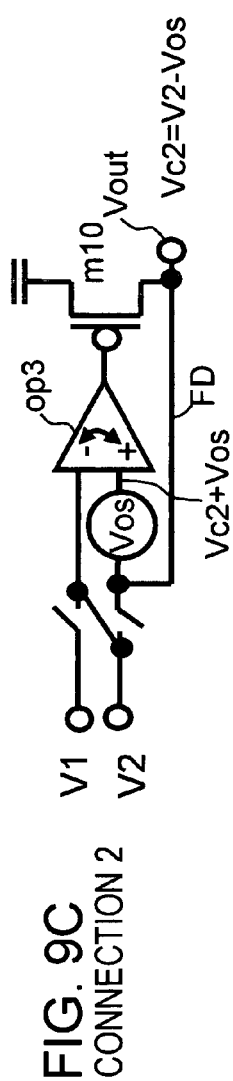
Figure 9D:
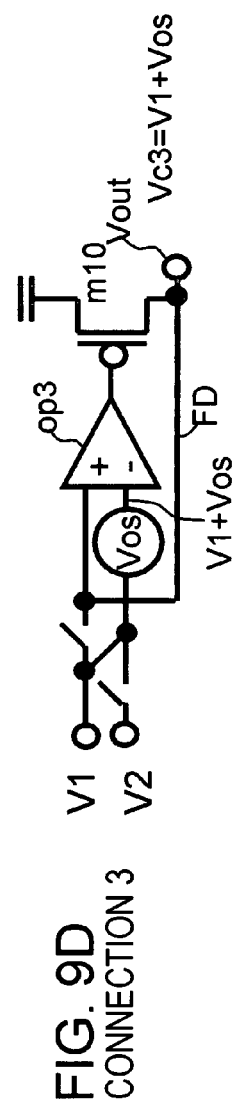

In addition, in the case of connection 3 of FIG. 9D, the input of the second monitor voltage V2 is prohibited, the first monitor voltage V1 is supplied to the inverting input terminal of the differential amplifier circuit op3, and the feedback FD is connected to the noninverting input terminal side of the differential amplifier circuit op3. When this connection state is established, in the balanced state, Vc3=V1+Vos and V1+Vos is outputted to the output terminal Vout.

The voltages Vc1, Vc2, and Vc3 measured from the output terminal Vout by means of connections 1, 2 and 3 are as follows:

$$Vc1 = V2 + Vos \quad (1)$$

$$Vc2 = V2 - Vos \quad (2)$$

$$Vc3 = V1 + Vos \quad (3)$$

Therefore, if the offset voltage Vos is found from equations (1) and (2) and the offset voltage Vos is subtracted based on equation (3), the first monitor voltage V1 can be found.

Therefore, if the voltages of (1), (2) and (3) above are each measured by means of connections 1, 2 and 3 at temperatures Tm1 and Tm2 respectively, the first monitor voltage V1 and the offset voltage second monitor voltage V2+Vos can be obtained, whereby the trimming point of resistor R3 for which the detection temperature is at the desired temperature Td coupled with the effect of the offset voltage can be detected.

Further, a connection 4 (not shown) in which the first monitor voltage V1 and second monitor voltage V2 of connection 2 of FIG. 9C are reversed is possible instead of the connection 3 above. In this case, Vc4=V1−Vos is outputted to the output terminal Vout. Therefore, if Vc4=V1−Vos is measured by means of connection 4 and the above offset voltage Vos is added, the first monitor voltage V1 can be found.

FIG. 10 is a circuit diagram of a differential amplifier circuit that permits switching to the four connection states in FIG. 9. In FIG. 10, the differential amplifier circuit comprises, in addition to the differential amplifier circuit op3 comprising the transistors m11 to m15, the transistors m10, m16, and m17, the resistor R11, and the feedback wiring FD, similarly to FIG. 6, and switching units SW1 to SW6 for switching the connections between the foregoing circuit elements are provided. These switching units change the connections between the three terminals a, b, and c in accordance with two control signals f and s. Further, the control signals f and s for the switching units and the gate signals pg2 and pg1 for the transistors m16 and m17 respectively are generated as control signal S100 by means of the control logic circuit 10. The control logic circuit 10 generates the control signals f and s for switching unit groups and the control signals pg1 and pg2 for the transistors in accordance with the input signals con1z, con2z, and con3z.

Figure 11:
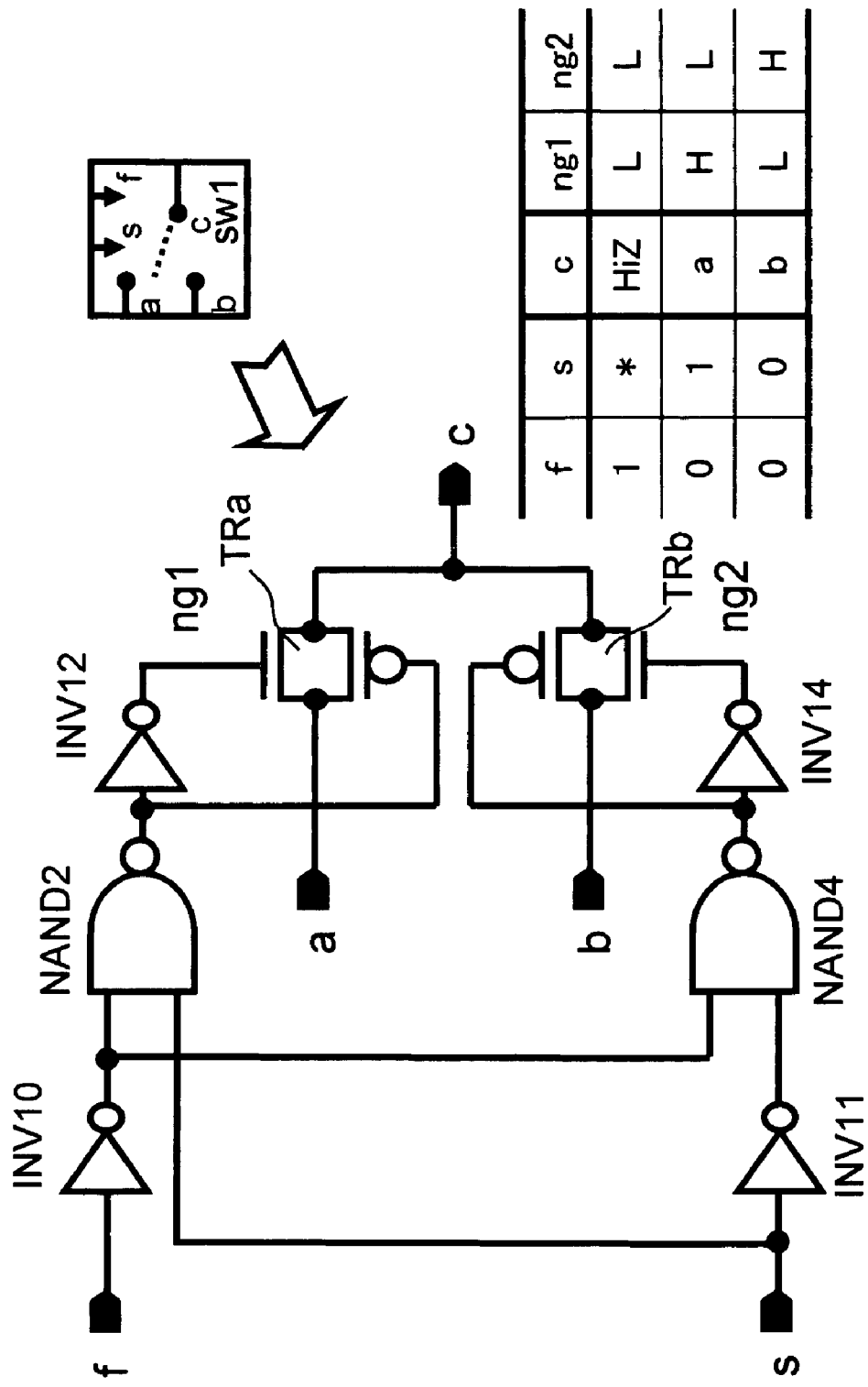
FIG. 11 shows a switching-unit circuit diagram and a truth table.

FIG. 11 shows a switching-unit circuit diagram and a truth table. The switching unit circuit comprises inverters INV10, 11, NAND gates NAND2 and NAND4, inverters INV 12 and 14, and CMOS transfer gates TRa and TRb. Further, as indicated by the truth table, control is implemented to produce three states corresponding to cases where the output terminal c enters a high impedance state HiZ, the output terminal c is connected to the input terminal a, and the output terminal c is connected to the input terminal b in accordance with the input control signals f and s.

FIG. 12 is a truth table that shows the operation of the control logic circuit 10 in FIG. 10. FIG. 12A is a truth table that shows what the control signals f and s for the switching units SW1 to SW6 and the control signals pg1 and pg2 for the transistor are in accordance with the input control signals con1z, con2z and con3z, while FIG. 12B is a table that shows the state of each switching unit and the state of the transistors m16, m17 in accordance with the control signals f, s, pg1 and pg2. As shown in FIG. 12A, when the input control signals con1z, con2z, and con3z are '0,0,0', switching is to the normal state (FIG. 9A); when the input control signals con1z, con2z, and con3z are '1,0,0', switching is to the state of connection 1 (FIG. 9B); when the input control signals con1z, con2z, and con3z are '0,1,0', switching is to the state of connection 2 (FIG. 9C; and when the input control signals con1z, con2z, and con3z are '0,0,1', switching is to the state of connection 3 (FIG. 9D).

FIG. 13 is a flowchart of the calibration procedure of the temperature sensor of this embodiment. The flowchart is an example where voltage measurement for calibration is performed by using the states of connections 1, 2 and 3 in FIG. 9. Therefore, on account of the similarity with the flowchart of FIG. 8, the same reference numerals have been assigned to the same procedures.

In calibration that utilizes the states of connections 1, 2, and 3, the temperature is first Tm1 (S10) and Vc1=V2+Vos is measured from the output terminal Vout in the state of connection 1 (S12), Vc2=V2−Vos is measured from the output terminal Vout in the state of connection 2 (S30), and Vc3=V1+Vos is measured from the output terminal Vout with respect to a plurality of resistors R3 in the state of connection 3 (S32). Next, the temperature is Tm2 (S16) and Vc1=V2+Vos is measured from the output terminal Vout in the state of connection 1 (S18), Vc2=V2−Vos is measured from the output terminal Vout in the state of connection 2 (S34), and Vc3=V1+Vos is measured from the output terminal Vout with respect to a plurality of resistors R3 in the state of connection 3 (S36). Thereafter, similarly to FIG. 8, the detection temperature Tx# with respect to a plurality of trimming points of the resistor R3 are found through calculation (S22), and the trimming point of the resistor R3 corresponding with the detection temperature Tx# that is closest to the desired detection temperature Td is detected (S24). The detection temperature Tx# is found in consideration of the effect of the offset voltage Vos of the differential amplifier circuit op3 and therefore corresponds to the actual detection temperature. The resistor R3 is set as the optimum resistor R3 detected as detailed above (S26). The differential amplifier circuit is then restored to the normal connection (S28).

As a result of switching to the states of connections 1, 2 and 3, the first monitor voltage V1, and V2+Vos, which is rendered by adding the offset voltage to the second monitor voltage, can be detected by means of a circuit in which the drain of the P-channel transistor m10 is the output terminal Vout. Therefore, even when the input impedance of the measuring device is small, the two voltages above can be measured correctly. As a result, calibration can be performed on the temperature sensor circuit without using a pad output buffer.

As described hereinabove, according to this embodiment, the differential amplifier circuit of the temperature sensor circuit can be switched to a state in which it is possible to output the first monitor voltage V1 and an offset monitor voltage V2+Vos that is rendered by adding the offset voltage Vos to the second monitor voltage V2 or to a state where a voltage from which V2+Vos can be calculated can be outputted. Accordingly, calibration of the detection temperature can be performed highly accurately.

What is claimed is:

1. A temperature sensor circuit, comprising:
    a first monitor voltage generation circuit that generates a first monitor voltage with a characteristic that changes with respect to temperature;

a second monitor voltage generation circuit that generates a second monitor voltage with a characteristic that changes by a variation amount different from the first monitor voltage with respect to the temperature; and a differential amplifier circuit, to which the first and second monitor voltages are inputted and that outputs a result of comparing the two voltages, wherein the differential amplifier circuit is capable of switching to a first connection state to output the comparison result, and to a second connection state to output an offset monitor voltage adding an offset voltage of the differential amplifier circuit to one of the first and second monitor voltage or subtracting the offset voltage therefrom.

2. The temperature sensor circuit according to claim 1, further comprising:

an output buffer circuit to which the offset monitor voltage or the first or second monitor voltage is inputted and that amplifies the voltage thus inputted to output.

3. The temperature sensor circuit according to claim 1, wherein the second connection state is a state where an input of one of the first monitor voltage and the second monitor voltage to one input terminal of the differential amplifier circuit is prohibited and where a negative feedback circuit is provided to the one input terminal from the output of the differential amplifier circuit.

4. The temperature sensor circuit according to claim 3, wherein the negative feedback circuit comprises:

an output transistor to a gate of which the output of the differential amplifier circuit is connected; and feedback wiring that connects a drain of the output transistor to the one input terminal of the differential amplifier circuit.

5. A temperature sensor circuit, comprising:

a first monitor voltage generation circuit that generates a first monitor voltage with a characteristic that changes with respect to temperature;

a second monitor voltage generation circuit that generates a second monitor voltage with a characteristic that changes by a variation amount different from the first monitor voltage with respect to the temperature; and a differential amplifier circuit, to which the first and second monitor voltages are inputted and that outputs a result of comparing the two voltages, wherein, the differential amplifier circuit includes a switching circuit that switches to a first connection state where the differential amplifier circuit outputs the comparison result, to a second connection state where the differential amplifier circuit outputs a first offset monitor voltage, adding offset voltage of the differential amplifier circuit to the second monitor voltage, to a third connection state where the differential amplifier circuit outputs a second offset monitor voltage, subtracting the offset voltage from the second monitor voltage, and to a fourth connection state where the differential amplifier circuit outputs a third offset voltage, adding the offset voltage to the first monitor voltage or subtracting the offset voltage therefrom.

6. The temperature sensor circuit according to claim 5, wherein the second, the third, and the fourth connection states are states where the input of one of the first monitor voltage and the second monitor voltage to one input terminal of the differential amplifier circuit is prohibited and where a negative feedback circuit that comprises an output transistor and feedback wiring is provided to connect the output of the differential amplifier circuit to the one input terminal.

7. The temperature sensor circuit according to claim 6, further comprising:

first and second switches that connect each of the first and second monitor voltages to the noninverting input terminal or inverting input terminal of the differential amplifier circuit;

a fifth switch that connects the output terminal of the differential amplifier circuit to the comparison result output terminal or output transistor; and a sixth switch that connects the drain of the output transistor to the noninverting input terminal or inverting input terminal of the differential amplifier circuit.

8. A calibration method for a temperature sensor circuit that comprises a first monitor voltage generation circuit that generates a first monitor voltage with a characteristic that changes with respect to temperature; a second monitor voltage generation circuit that generates a second monitor voltage with a characteristic that changes by a variation amount different from the first monitor voltage with respect to the temperature; and a differential amplifier circuit, to which the first and second monitor voltages are inputted and that outputs a result of comparing the two voltages, the differential amplifier circuit being capable of switching to a first connection state to output the comparison result, and to a second connection state to output an offset monitor voltage that is rendered by adding an offset voltage of the differential amplifier circuit to the first or second monitor voltage or subtracting the offset voltage therefrom, the calibration method comprising the steps of:

detecting a first-temperature state offset monitor voltage that is rendered by establishing the second connection state and adding the offset voltage to the first or second monitor voltage or subtracting the offset voltage therefrom in the first temperature state;

detecting a second-temperature state offset monitor voltage that is rendered by adding the offset voltage to the first or second monitor voltage or subtracting the offset voltage therefrom in a second temperature state that differs from the first temperature state; and trimming circuit elements of the first or second monitor voltage generation circuit to generate the first or second monitor voltage so that a detection temperature determined on the basis of the first- and second-temperature state offset monitor voltages becomes a desired detection temperature.

9. The temperature sensor circuit calibration method according to claim 8, further comprising the step of detecting, in the first and second temperature states respectively, the temperature state offset monitor voltage for one of the first and second monitor voltage or the other of the first and second monitor voltages in correspondence with a plurality of trimming values with respect to circuit elements of the first or second monitor voltage generation circuit.

10. The temperature sensor circuit calibration method according to claim 8, wherein the second connection state includes:

a state where a first offset monitor voltage, which is rendered by adding the offset voltage to one of the first and second monitor voltage, is outputted;

a state where a second offset monitor voltage, which is rendered by subtracting the offset voltage from one of the first and second monitor voltage, is outputted; and a state where a third offset monitor voltage, which is rendered by adding the offset voltage to the other of the first and second monitor voltages or subtracting the offset voltage therefrom, is outputted, wherein, in the first and second temperature states respectively, the first, second, and third offset monitor voltages are detected as the first- and second-temperature state offset monitor voltages.

11. The temperature sensor circuit calibration method according to claim 8, further comprising:

a step of returning to the first connection state after the trimming step.

* * * * *